UNITED STATES PATENT OFFICE.

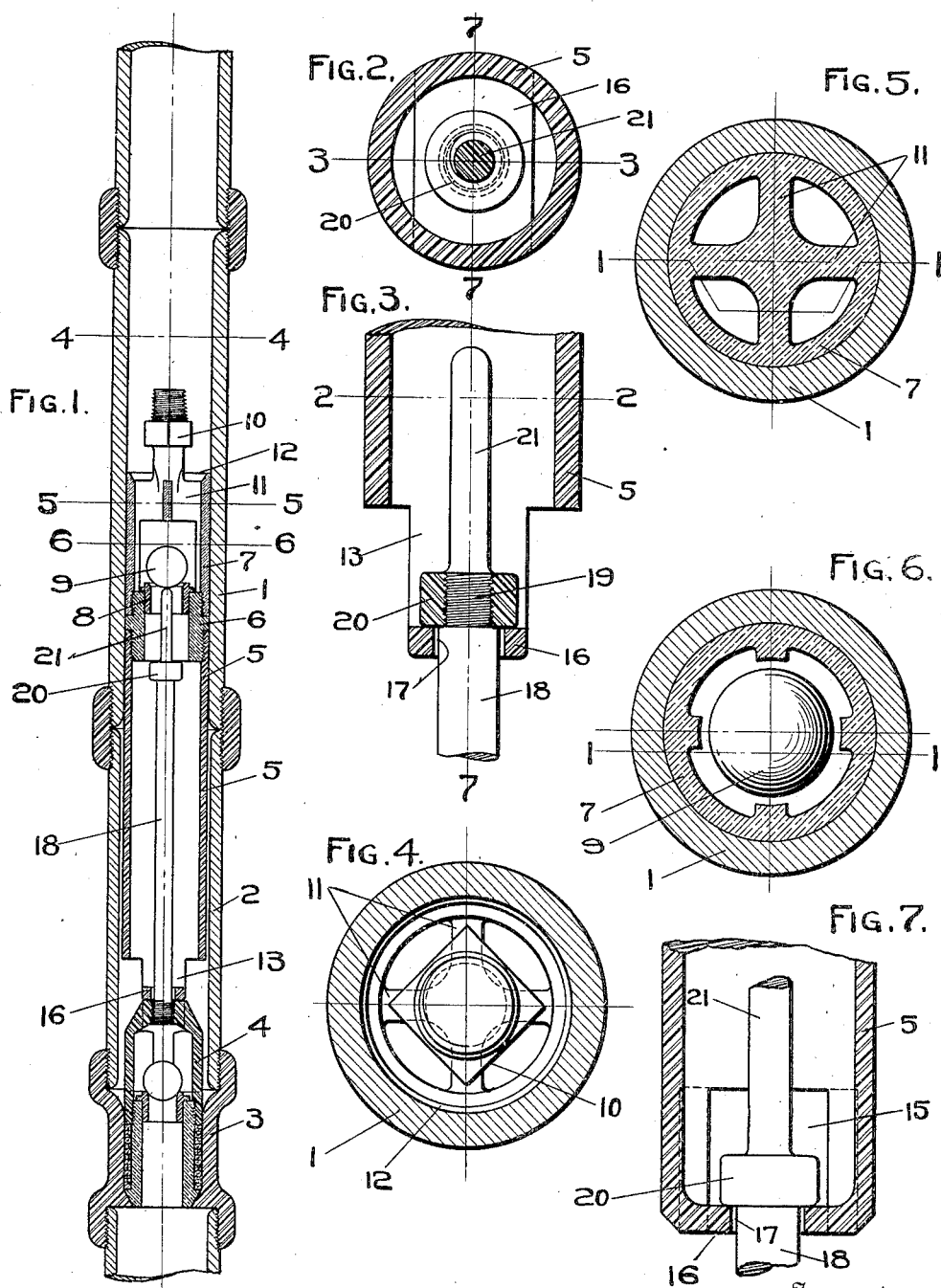

RUDOLPH CONRADER, OF ERIE, PENNSYLVANIA.

PUMP.

1,067,312.　　　Specification of Letters Patent.　　Patented July 15, 1913.

Application filed September 19, 1910. Serial No. 582,610.

*To all whom it may concern:*

Be it known that I, RUDOLPH CONRADER, a citizen of the United States, residing at Erie, in the county of Erie and State of Pennsylvania, have invented new and useful Improvements in Pumps, of which the following is a specification.

This invention relates to pumps, and consists in certain improvements in the construction therein, as will be hereinafter fully described and pointed out in the claims.

The invention is illustrated in the accompanying drawings as follows:

Figure 1 is approximately a central section through the device, the section being on the line 1—1 in Figs. 5 and 6. Fig. 2 a section on the line 2—2 in Fig. 3. Fig. 3 a section on the line 3—3 in Fig. 2. Fig. 4 a section on the line 4—4 in Fig. 1. Fig. 5 a section on the line 5—5 in Fig. 1. Fig. 6 a section on the line 6—6 in Fig. 1. Fig. 7 a section on the line 7—7 in Figs. 2 and 3.

1 marks the working barrel, 2 an extension on the working barrel, 3 a standing barrel fitting, and 4 a standing valve.

The plunger is made up of the tubular plunger section 5 which forms a metallic sliding fit with the working barrel 1. A fitting 6 is screwed into the upper end of the tube 5. The plunger is screw threaded for this purpose, and the fitting 6 has an annular shoulder extending preferably flush with the surface of the tube 5. A plunger valve cage 7 is in the form of a cup forming a sand trap for the plunger. This cage has an internal screw threaded on its lower end, and is screwed into the fitting 6. The surface of the cup forms a sliding fit with the working barrel, the surfaces of the shoulder 6 and tubs 5 forming preferably a continuous surface. A plunger valve seat 8 rests on the shoulder 6 and a check valve 9 is carried in the cage or cup 7 and operates upon this seat. A sucker rod connection 10 is secured to the webs 11 which extend from this sucker rod connection 10 to the walls of the cup 7 forming a passage through which the liquid passing the plunger discharges. The upper edge 12 of the cup is above the tops of the webs 11, thus forming a continuous opening for the top of the cup, and thus preventing a leakage of sand at points on the edge of the cup.

The lower end of the tube 5 has the lips 13 preferably formed integrally with the tube with a connecting bar 16. A perforation 17 is arranged in this bar, a rod 18 is secured to the top of the standing valve and extends upwardly through the perforation 17. This rod near its upper end has screw threads 19 on which the nut 20 is secured, forming a shoulder which engages the bar 16 when the plunger is withdrawn from the pump, and thus lifts the standing valve with the plunger. The tube 5 is of sufficient length so that in the normal operation of the pump, the shoulder 20 does not engage the bar so as to interfere with the ordinary reciprocation of the plunger.

The rod 18 has the extension 21 above the screw threads 19 which when the plunger is in its lower position engages the check valve 9 so as to lift it from its seat, thus permitting the liquid above the plunger to drain past the plunger valve.

The sides of the lips 13 together with the bar 16 form wrench hold surfaces by means of which the tube 5 may be readily held for unscrewing the cup 7 so as to expose the valve seat and valve. This is very desirable because it is difficult to so engage the surfaces of the tube forming the plunger as to unscrew the parts without injuriously marring these surfaces. The sand trap may be held through the sucker rod extension 10.

By making the lips 13 with the bar 16 integral, with the tube, a large opening may be left leading to the tube and still get sufficient strength to readily lift the standing valve with the plunger. This is desirable because with the small space available in deep wells, it is difficult to get sufficient strength to lift the standing valve, especially where it becomes jammed or wedged in its socket, and at the same time have sufficient opening for the movement of liquid.

What I claim as new is:

1. In a pump, the combination of a working barrel, a plunger sleeve having a lip integral with the sleeve on its lower end forming wrench hold surfaces; a valve seat in the plunger; and screw threaded means for locking the seat in the plunger.

2. In a pump, the combination of a working barrel; a plunger sleeve in the barrel, having lips integral with the sleeve extending from its lower end, forming wrench hold surfaces and an internal shoulder; a valve seat in the plunger; screw threaded means for locking the seat in the plunger; a standing valve; a rod extending upwardly from the standing valve; and a means on the rod for engaging the shoulder.

3. In a pump, the combination of a working barrel; a plunger sleeve in the working barrel having lips integral with the sleeve at its lower end forming openings at the sides forming wrench hold surfaces and an internal shoulder; a valve seat in the plunger; screw threaded means for locking the seat in the plunger; a standing valve; a rod extending upwardly from the standing valve; and a means on the rod for engaging the shoulder.

4. In a pump, the combination of a working barrel; a plunger sleeve in the working barrel having lips extending integrally therefrom, forming an integral shoulder; a standing valve; a rod extending upwardly from the standing valve into the sleeve; and means on the rod for engaging the integral shoulder.

5. In a pump, the combination of a working barrel; a plunger sleeve in the working barrel having integral lips extending downwardly therefrom with a connecting bar; a standing valve; a rod extending upwardly from the standing valve into the sleeve; and means on the rod for engaging the bar.

6. In a pump, the combination of a working barrel; a plunger sleeve in the working barrel, said sleeve having downwardly extending lips integral with the sleeve and a connecting bar, the lips forming side openings to the plunger, and the bar having a central perforation; a standing valve; a rod extending upwardly from the standing valve and means on the rod for engaging the bar.

In testimony whereof I have hereunto set my hand in the presence of two subscribing witnesses.

RUDOLPH CONRADER.

Witnesses:
H. C. LORD,
BLANCHE HARTMAN.

---

Copies of this patent may be obtained for five cents each, by addressing the "Commissioner of Patents, Washington, D. C."